No. 737,606. PATENTED SEPT. 1, 1903.
G. J. GRABOWENSKI.
DEHORNER.
APPLICATION FILED JUNE 10, 1903.
NO MODEL. 2 SHEETS—SHEET 1.
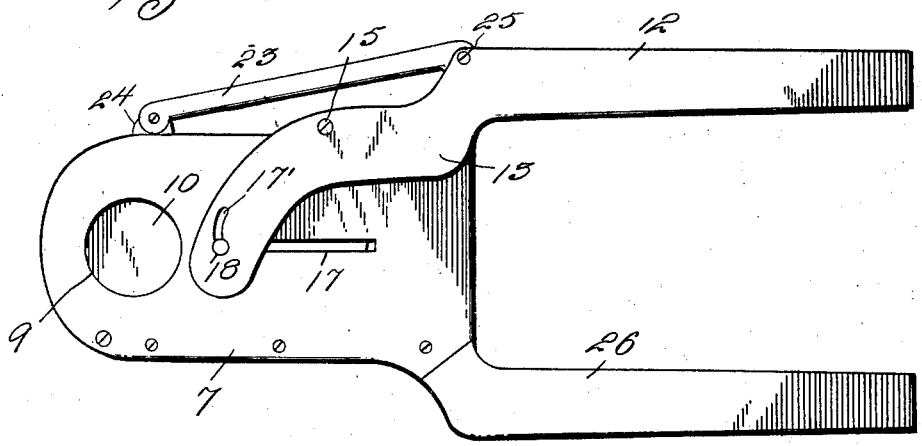
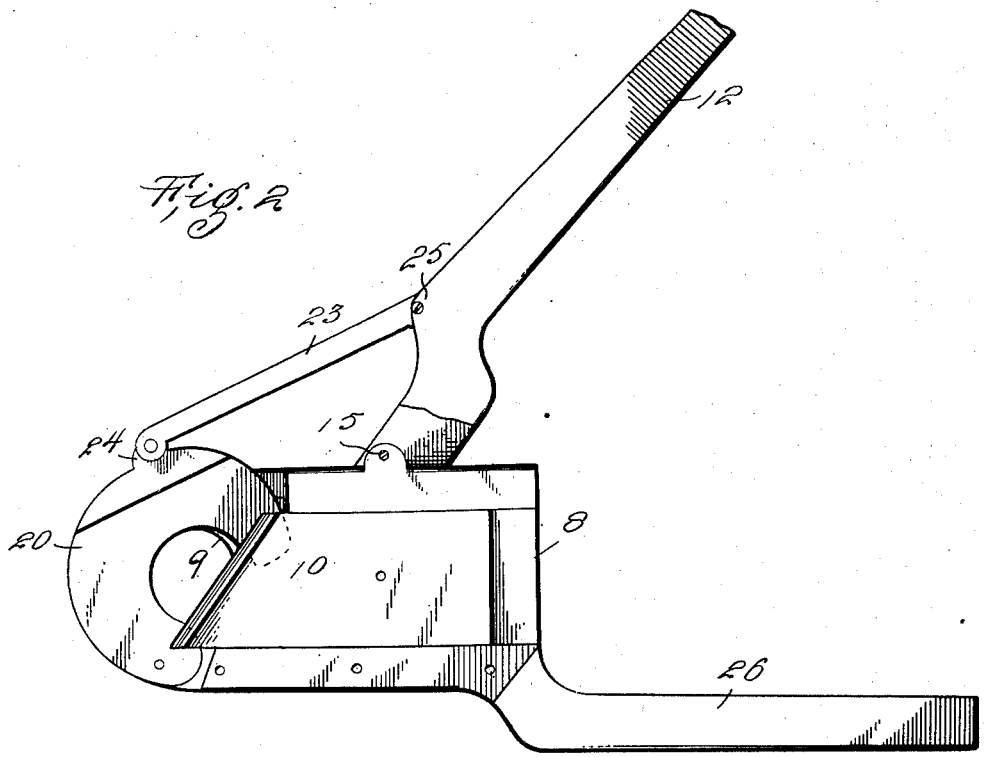
Witnesses
Inventor
G. J. Grabowenski
By Chandlee & Chandlee
Attorneys

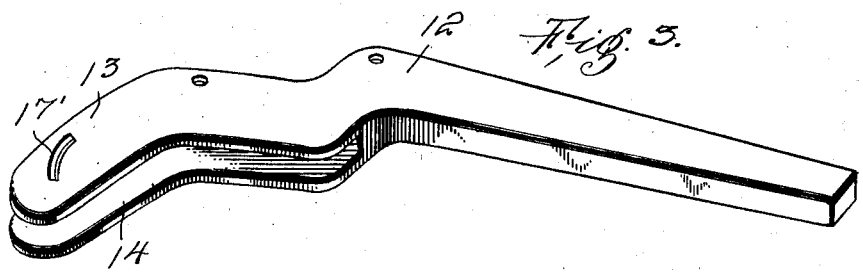
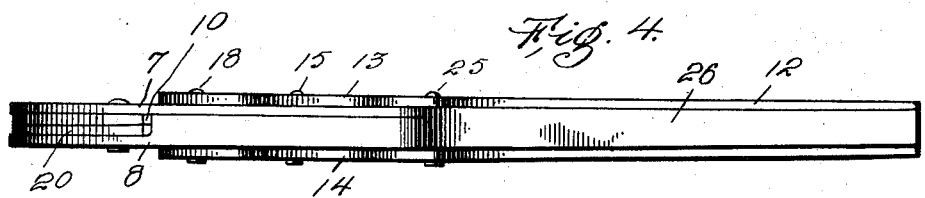
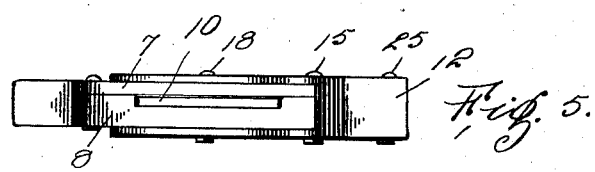
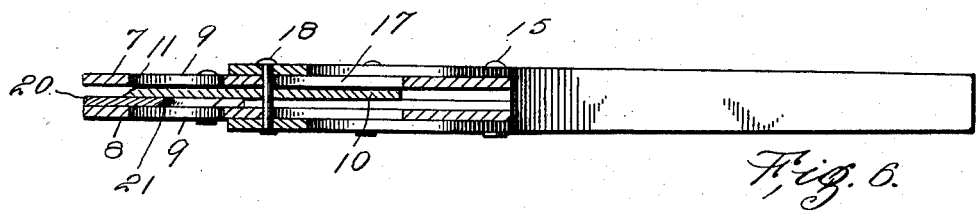

No. 737,606. Patented September 1, 1903.

UNITED STATES PATENT OFFICE.

GEORGE J. GRABOWENSKI, OF MANKATO, MINNESOTA.

DEHORNER.

SPECIFICATION forming part of Letters Patent No. 737,606, dated September 1, 1903.

Application filed June 10, 1903. Serial No. 160,809. (No model.)

*To all whom it may concern:*

Be it known that I, GEORGE J. GRABOWENSKI, a citizen of the United States, residing at Mankato, in the county of Blue Earth, State of Minnesota, have invented certain new and useful Improvements in Dehorners; and I do hereby declare the following to be a full, clear, and exact description of the invention, such as will enable others skilled in the art to which it appertains to make and use the same.

This invention relates to that class of instruments known as "dehorners" and which are employed in cutting off the horns of animals, the object of the invention being to provide a construction wherein will be employed two movable cutting-blades so pivoted and operated that there will be obtained the combination of a shear cut and a thrust cut, so that the operation of cutting may be performed with the expenditure of a minimum of energy by reason of a drawing action which is present.

In the drawings forming a portion of this specification, and in which like numerals of reference indicate similar parts in the several views, Figure 1 is a plan view of the instrument. Fig. 2 is a view similar to Fig. 1 with the top plate removed and the cutting-blades separated. Fig. 3 is a detail view of the operating-lever. Fig. 4 is a side elevation. Fig. 5 is an end elevation. Fig. 6 is a longitudinal section.

Referring now to the drawings, the present dehorner comprises a casing including vertically-spaced plates 7 and 8 of skeleton formation and which are mutually connected at portions of their side edges, said plates having alining perforations 9 at one end, which perforations are preferably round, as shown, and are designed to receive the horns that are to be cut. Within the casing is slidably mounted a blade 10, having a diagonal cutting edge 11 at one end, and which blade in its sliding movement carries its diagonal cutting edge transversely of the perforations in the plates forming the top and bottom of the casing to engage and cut a horn which may be passed through the perforation. To operate the blade 10, a lever 12 is provided, which is bifurcated at one end to form the arms 13 and 14, which arms are disposed to straddle or lie at each side of the casing, a pivot-pin 15 being passed through the arms of the lever and through the laterally-directed ear 16 at one side of the casing. Longitudinally of the casing is formed a slot 17, and through this slot is passed a pin 18, which engages the blade 10 and projects with both ends beyond the sides of the casing, the ends of the pin lying in the arc-shaped slots 17', formed in the arms 13 and 14 and eccentric to the pivot of the lever 12. With this arrangement as the lever is swung in one direction the cutting-blade is moved forwardly across the perforations in the end of the casing, at which time the pin 18 travels along the slots 17' in the arms 13 and 14. Upon return movement of the lever the pin 18 returns through the slots 17' and the cutting-blade is retracted.

Coöperating with the blade 10 is a second blade 20, which is semicircular in shape and which is pivoted at one end between the plates 7 and 8 of the casing, at the side of the casing adjacent to the higher end of the cutting edge of the blade 10, this blade in its pivotal movement swinging with its convex cutting edge 21 toward and away from the cutting edge 11, so that the blade 20 has a shearing movement with respect to the blade 10 while the latter is moved or operated with a straight thrust, the combination of the two movements resulting in a most efficient action. To operate the semicircular cutting-blade, a link 23 is provided and is pivotally connected at one end to the ear 24 on the cutting-blade 20 while its opposite end is pivoted between the ears 25 of the lever 12. This arrangement is such that as the lever is operated the blade 10 is bodily moved while the blade 20 is swung or pivotally moved. The casing is provided with a handle 26, which is grasped with one hand by the operator, while the actuating-lever is grasped with the other hand.

It will be understood that in practice modifications of the specific construction shown may be made and that any suitable materials and proportions may be used for the various parts without departing from the spirit of the invention.

What is claimed is—

In a dehorner, the combination with a casing having a handle, of a cutting-blade slidably mounted in the casing, a second cutting-blade pivoted in the casing and having a concave cutting edge arranged to coöperate with the first-named cutting-blade, and a lever pivoted to the casing and connected with both cutting-blades for operating them.

In testimony whereof I affix my signature in presence of two witnesses.

GEORGE J. GRABOWENSKI.

Witnesses:
C. L. BENEDICT,
DANIEL FICHTHORN.